(12) United States Patent
Wilson

(10) Patent No.: US 6,312,492 B1
(45) Date of Patent: Nov. 6, 2001

(54) BENEFICIATION OF ANIMAL MANURE

(76) Inventor: Harold W. Wilson, 6985 Market St., El Paso, TX (US) 79915

( * ) Notice: Subject to any disclaimer, the term of this patent is extended or adjusted under 35 U.S.C. 154(b) by 0 days.

(21) Appl. No.: 09/400,201

(22) Filed: Sep. 21, 1999

(51) Int. Cl.$^7$ .................................................. C05F 3/00
(52) U.S. Cl. ...................... 71/21; 71/22; 71/23; 71/24; 71/28; 71/30; 71/34; 71/36
(58) Field of Search ................................. 71/21, 22, 23, 71/24, 28, 30, 34, 36

(56) References Cited

U.S. PATENT DOCUMENTS

| | | | |
|---|---|---|---|
| 1,695,081 | 12/1928 | Barsky et al. | |
| 1,963,909 | 6/1934 | MacIntire et al. | 71/6 |
| 3,865,568 | * 2/1975 | Kratzer | 71/21 |
| 3,938,279 | 2/1976 | Fonne | 47/9 |
| 3,939,280 | * 2/1976 | Karnemaat | 426/2 |
| 3,960,718 | * 6/1976 | Lebo | 210/14 |
| 3,989,498 | 11/1976 | Cox | 71/3 |
| 4,210,680 | * 7/1980 | Dawson et al. | 426/641 |
| 4,230,478 | 10/1980 | Zumbrunn | 71/3 |
| 4,410,350 | * 10/1983 | Judd | 71/63 |
| 5,118,337 | * 6/1992 | Bleeker | 71/21 |
| 5,137,687 | 8/1992 | Dunson, Jr. | 422/5 |
| 5,393,317 | 2/1995 | Robinson | 71/12 |
| 5,411,567 | * 5/1995 | Ueotani et al. | 71/9 |
| 5,466,273 | 11/1995 | Connell | 71/11 |
| 5,486,068 | 1/1996 | Wilson | 405/129 |
| 5,574,093 | 11/1996 | States, Sr. et al. | 514/772.1 |
| 5,736,032 | 4/1998 | Cox et al. | 424/76.5 |
| 6,159,262 | * 12/2000 | Tumbers | 71/7 |

FOREIGN PATENT DOCUMENTS 4 8096360 * 10/1979 (JP) .

* cited by examiner

*Primary Examiner*—Chhaya D. Sayala
(74) *Attorney, Agent, or Firm*—Jacobson Holman, PLLC

(57) ABSTRACT

A process for treating animal manure, particularly poultry feces, with concentrated sulfuric acid (about 93 to 95% $H_2SO_4$). The product of the process can be used for treating agricultural soils.

28 Claims, No Drawings

BENEFICIATION OF ANIMAL MANURE

Animal manure or excrement is usually thought of as waste matter existing in a dry state, such as dried poultry litter. The animal manure is often in combination with various kinds and amounts of highly absorbent materials. These highly absorbent materials are employed as bedding materials in animal confinement residences for the main purpose of trapping and containing the animal excrement. The highly absorbent materials absorb volatile liquids leaving residual semi-dry to dry excrement in combination with the attendant absorbent materials in a semi-decimated state.

Animal feces are essentially a mixture of bacteria, humus, lignin, cellulose, and water with the elements nitrogen, phosphorous, potassium, sulfur and calcium in poultry feces present mostly as water-insoluble organic compounds. These water-insoluble organic compounds must be decomposed before these nutrients can become available for use by plants in agricultural soils containing such manures.

Animal manure also typically contains urine. The urinary excretions are actually an admixture of urine in concentrated form with the fecal matter excreted together. About 60 to 80% by weight of the urinary nitrogen may be present as urea—$CO(NH_2)_2$ and ammoniacal compounds. The balance is a mixture of insoluble uric acid and several other unavailable nitrogen containing compounds.

Animal fecal matter, particularly of poultry excrement, typically contains the following by weight:

| | |
|---|---|
| moisture | 64.8% |
| organic matter | 30.7% |
| nitrogen | 0.9% |
| $P_2O_5$ | 0.5% |
| $K_2O$ | 0.8% |
| NaO | 0.2% |
| CaO | 0.5% |
| MgO | 0.2% |
| $R_2O_3$ | 0.6% |
| Cl | 0.1% |
| $SO_3$ | 0.1% |
| $SiO_2$ and acid insoluble materials | 2.0% |
| ash | 4.7% | and trace elements. The trace elements include CuO, MnO, ZnO, $B_2O_3$, etc. and are typically present in an amount of about 0.005% by weight maximum.

Poultry manures are ordinarily found present in combination with one or more of several types of highly adsorbent materials such as saw dust, ground wood, wood shavings, plant stalks, shredded paper and similar large cellulosic content materials, as well as several other adsorbent materials such as peat moss and lignaceous peat compounds. A mixture of poultry excrement with varied amounts of such adsorbent materials is commonly referred to as "poultry litter".

The present invention relates to the chemical treatment of animal manure to convert the insoluble organic matter containing plant nutritional elements such as nitrogen, phosphorous, potassium, sulfur, and calcium in plant unavailable form into soluble plant/nutritional materials in plant available form. This is accomplished by solubilizing the organic matter and causing one or more of the following chemical reactions to take place: neutralization, oxidation, sulfation, sulfonation, deamination, decarboxylation, conversion of malodorous indole, skatole, and phenol into etheral sulfates and etheral sulfuric acid compounds along with several additional reactions.

Experiments have shown that, in addition to the above-noted reactions with poultry manure per se, similar solubilization and chemical reactions take place with the chemical treatment of the following named poultry tissues obtained from commercial harvesting of poultry: insoluble epithelial tissue (e.g., feathers, epidermal skin and insoluble keratin-containing tissue); cartillagenous tissue (e.g., insoluble chondromucoid, chondroalbumenoid and collagen); connective tissue (e.g., elastin and tissues consisting of insoluble polypeptide linkages held together by disulfide bonds as present in cystine, and in similar amino acids such as histidine, aragonine and lysine); bone (e.g., osseous tissue); and internal poultry organs (visceral) including lungs, kidneys, gonads, intestines and bowels in general. Thus, the present invention relates to the chemical treatment of poultry excrement, poultry litter, and/or animal manures and harvest wastes, singularly or in combination.

In accordance with the invention, animal manure, preferably a combination of animal manure and animal bedding, referred to commonly as "animal litter", and which essentially is dry animal excrement in combination with cellulosic matter, is treated. More specifically, this material is treated with concentrated sulfuric acid having a strength of about 93 to 95% $H_2SO_4$. If the animal excrement is not combined with such cellulosic material, the animal excrement (manure) may be admixed with such cellulose-containing material in a proportion such that the combination excrement and cellulose absorbent product contains about 15 to 25% by weight cellulosic matter and about 75 to 85% by weight animal excrement.

The source of the animal excrement may be from any one or more of the following animals: cow, poultry, swine, goat, sheep and the like. The amount of animal manure or litter and concentrated sulfuric acid used should be in a ratio of about 5 to 7 parts by weight of animal manure or litter to about one part by weight of about 93 to 95% strength concentrated sulfuric acid.

The about 93 to 95% strength sulfuric acid is intimately combined with the animal manure or litter. This causes a temperature rise of the acid-excrement mixture from about 75° F. to about 160° to 19° F. over a period of several minutes. During this time period, the acid produces dehydration of the animal litter as the reaction continues with positive continuing thermal increases accompanied by very strong oxidation reactions. This is coupled with several additional chemical and physical changes all adverse to the survival of any pathogenic bacteria which may be present, such as gram negative salmonella, eschcoli, gonococcus, Brucella, Serratia, etc.

The waste is first sized (by grinding if necessary), preferably to less than 1.0 inch, more preferably to less than 0.5 inch and most preferably to less than 0.25 inch, then placed in an acid resistant receptacle and mixed with sufficient sulfuric acid of a concentration of about 93 to 95% $H_2SO_4$ so that the mixture contains about 3 to 15% $H_2SO_4$ by weight. After thoroughly combining the acid with the waste, an addition of about 2 to 5% by weight of a known germicide, such as pine oil (typically about 85% alpha terpineol content), may be made to the acid waste mixture after which all of the ingredients are thoroughly combined. This mixture is then dried for immediate usage or stored for later use by heating to a temperature ranging between about 100 and 105° C.

The combination treatment of the waste, first, directly with the high strength concentrated sulfuric acid (about 93 to 95% $H_2SO_4$ content), second, directly with a germicide such as terpene alcohol (alpha terpineol) and, third, with heat by heating the treated waste product to an about 100 to 105° C. drying temperature to effect removal of all uncombined moisture, results in a product which is bacteria-, fungi-, and mold-free. In addition, if terpene alcohol is used as the germicide, the introduction of the terpene alcohol into the mixture allows for partial conversion of the alcohol into an anionic surfactant to enhance the penetration and wetting properties of the soil to which the finished product is added.

The initial product may be wetted with about 6 to 8% by weight water, granulated to desired size and heated to about 100° C. to dry the product. The product can be used for soil treatment without further treatment. However, if it is desired to store the product, it can be treated with about 2 to 5% by weight of a germicide such as pine oil preferably composed of alpha terpineol (about 80 to 86%) in the form, for example, of a 6% aqueous emulsion before granulating and drying. This treatment acts as an antiseptic and germicide to prevent germ invasion during storage of the product.

If it is desired to effect an increase of plant nutrient content, the initial product described above may be treated with requisite amounts of chemical compounds such as urea, diammonium phosphate, ammonium sulfate, n-$P_2O_5$.$K_2O$, etc. before addition of water and granulation. This treatment can be used to result in organic matter based formulations with a wide variety of primary plant nutrient ratios such as 1:1, 1:2, 2:1:1, 3:1:2, etc.

The finished products are superior to untreated, insoluble animal waste products in that they contain higher percentages of available nitrogen, phosphorous, potassium, sulfur, and calcium and available trace elements. The finished products also are able to provide greater amounts of partially decomposed and decomposed organic matter to more quickly improve and beneficiate agricultural soil.

All of the materials employed in this invention occur in abundant and widely available amounts. The high strength sulfuric acid is readily produced in large quantities from the sulfur oxide gases obtained from the heat treatment of the vast amounts of base metal pyritic ores (e.g., from copper and zinc pyrites) as well as from the treatment of the oxides of elemental sulfur. The animal wastes are likewise extremely abundant.

The use of these treated waste products will yield products which can readily be used, singularly or in combination with other chemical fertilizers, as an excellent source of organic matter. These treated waste products are also a source of primary, secondary, and trace elements. The products also may be immediately used or stored as a stable material for later use.

The examples shown below are illustrative of the treatment of animal wastes with the above-described process:

EXAMPLE 1

Twenty-five hundred (2500) grams of dried poultry litter were thoroughly mixed with 100 mls. of concentrated sulfuric acid (93.17% $H_2SO_4$ content) after which this mixture was combined and thoroughly mixed with 100 mls. of pine oil (85% alpha terpineol content). The resultant mixture after being dried at 100–105° C. weighed approximately 2800 grams.

EXAMPLE 2

A composite mixture of 1250 grams of ground poultry harvest waste was made which consisted of an assortment of waste poultry tissues including epithelial tissue (epidermal skin layers, feathers, and keratin-containing tissues); connective tissue (ligament and tendon, white fibrous); cartillaginous tissue (chondromucoid and chondroalbumenoid); muscle tissue (myosin content tissue); osseous tissue (bone) ; nervous tissue (glycogen and polysaccharide content tissue); other tissue having contents of polypeptide disulfide amino acid linkage and protein containing matter, etc.; heads, wing tips, and feet including legs; and eviscerate (including intestines with and including kidneys, lungs, gonads, and thoracic tissues). To this 1250 gm lot of ground poultry waste was added 100 mls of warm (150–175° F.) sulfuric acid having a 93 to 95% $H_2SO_4$ content and the acid was thoroughly mixed with the waste after which a 75 gram lot of pine oil (85% alpha terpineol content) was added to the mixture and the entire lot thoroughly mixed together. Then, a 400 gram lot of dried poultry litter was added to the mixture of poultry waste, acid, and terpene alcohol and thoroughly mixed after which the resultant product was dried (at 100–105° C.) to a weight of approximately 1000 grams.

EXAMPLE 3

A composite mixture of poultry harvest wastes similar to the composition of Example 2 was divided into two equal parts and one part was cooked in a microwave oven while the other part remained raw (uncooked). The two parts were combined, intimately mixed, and then processed in exactly the same manner as was employed in Example 2 in order to illustrate that waste animal residues from heat processing could be treated by the process of this invention for their conversion into agricultural soil products with increased contents of available plant nutrients in comparison with similar non-treated wastes.

The following table represents the biological examination of 7-7-7 flower and garden food composite of poultry litter prepared in accordance with the present invention:

| Parameter | Results | Units |
| --- | --- | --- |
| Aerobic Plate Count | <10 | CFU Per Gram |
| Yeast and Mold Count | <10 | CFU Per Gram |
| Coliform | <3 | MPN/Gram |
| Fecal Coliform | <3 | MPN/Gram |
| *Escherichia Coli* | <3 | MPN/Gram |
| *E. Coli* O157:H7 | Negative | Per 25 Grams |
| *Bacillus Cereus* | <3 | MPN/Gram |
| *Mesophillic Anaerobes* | <3 | MPN/Gram |
| *Staphylococcus aureus* | <3 | MPN/Gram |
| Salmonella | None Detected | Per 25 Grams |
| Shigella | None Detected | Per 25 Grams |
| *Listeria monocytogeres* | None Detected | Per 25 Grams |

Methods
1. Official Methods Of Analysis, AOAC International, 16th Edition, 1995
2. Bacteriological Analytical Manual, FDA, 8th Edition, 1995
3. United State Pharmacopeia, USP, 23rd Edition, 1995

Further, the foregoing should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed is:

1. A process for treating animal manure materials or animal manure materials in combination with cellulose containing materials comprising directly applying concentrated sulfuric acid to said materials, thoroughly admixing said concentrated sulfuric acid and said materials, and drying the resultant mixture.

2. The process of claim 1 wherein the concentrated sulfuric acid has a concentration of about 93 to 95% $H_2SO_4$.

3. The process of claim 1 wherein the materials have a particle size of less than about one-quarter inch.

4. The process of claim 1 wherein the materials have been dried.

5. The process of claim 1 wherein the resultant mixture is dried at a temperature of about 100 to 105° C.

6. The process of claim 1 wherein the materials are poultry harvest waste, poultry feces or poultry feces in combination with cellulose containing materials.

7. The process of claim 1 wherein the resultant mixture contains between about 3 and 15% of $H_2SO_4$ by weight.

8. The process of claim 1 wherein the resultant mixture is treated with pine oil before drying.

9. The process of claim 1 wherein the dried resultant mixture is reacted with urea.

10. The process of claim 1 wherein the dried resultant mixture is added to diammonium phosphate.

11. The process of claim 1 wherein the dried resultant mixture is used to treat agricultural soil.

12. A process for treating waste materials selected from the group consisting of animal harvest waste, animal manure and animal manure in combination with cellulose containing materials comprising directly adding concentrated sulfuric acid having a concentration of about 93 to 95% by weight to said waste materials, thoroughly admixing said concentrated sulfuric acid and said materials, and drying the resultant mixture.

13. The process of claim 12 wherein the concentrated sulfuric acid has a concentration of about 93.17% $H_2SO_4$.

14. The process of claim 12 wherein the materials have a particle size of less than about one-quarter inch.

15. The process of claim 12 wherein the materials have been dried.

16. The process of claim 12 wherein the resultant mixture is dried at a temperature of about 100 to 105° C.

17. The process of claim 12 wherein the materials are poultry feces or poultry feces in combination with cellulose containing materials.

18. The process of claim 12 wherein the resultant mixture contains between about 3 and 15% of $H_2SO_4$ by weight.

19. The process of claim 12 wherein the resultant mixture is treated with pine oil before drying.

20. The process of claim 12 wherein the dried resultant mixture is reacted with urea.

21. The process of claim 12 wherein the dried resultant mixture is added to diammonium phosphate.

22. The process of claim 12 wherein the dried resultant mixture is used to treat agricultural soil.

23. A product for treating agricultural soil prepared by the process of directly applying a concentrated sulfuric acid to animal manure materials or animal manure materials in combination with cellulose containing materials to thoroughly admix said concentrated sulfuric acid and said materials, and drying the resultant mixture.

24. The produce of claim 23 wherein the concentrated sulfuric acid has a concentration of about 93 to 95% $H_2SO_4$.

25. The product of claim 23 wherein the materials have a particle size of about less than one-quarter inch.

26. The product of claim 23 wherein the materials have been dried.

27. The product of claim 23 wherein the materials are selected from the group consisting of poultry feces or poultry feces in combination with cellulose containing materials.

28. The product of claim 23 wherein the dried resultant mixture is treated with pine oil.

* * * * *